United States Patent
Fan et al.

(10) Patent No.: US 8,390,564 B2
(45) Date of Patent: Mar. 5, 2013

(54) DISPLAY

(75) Inventors: Shih-Kang Fan, Hsinchu (TW);
Cheng-Pu Chiu, Taipei County (TW);
Chi-Neng Mo, Taoyuan County (TW);
Mei-Tsao Chiang, Taoyuan County (TW)

(73) Assignees: Chunghwa Picture Tubes, Ltd., Taoyuan (TW); National Chiao Tung University, Hsinchu (TW)

( * ) Notice: Subject to any disclaimer, the term of this patent is extended or adjusted under 35 U.S.C. 154(b) by 1374 days.

(21) Appl. No.: 12/060,255

(22) Filed: Mar. 31, 2008

(65) Prior Publication Data

US 2009/0135131 A1    May 28, 2009

(30) Foreign Application Priority Data

Nov. 23, 2007    (TW) .............................. 96144421 A

(51) Int. Cl.
*G09G 3/34*    (2006.01)
(52) U.S. Cl. ........................................ 345/107; 359/296
(58) Field of Classification Search .................. 345/33, 345/55, 107, 690; 359/296
See application file for complete search history.

(56) References Cited

U.S. PATENT DOCUMENTS

| | | | |
|---|---|---|---|
| 7,106,297 B2 | 9/2006 | Shannon et al. | |
| 2002/0180688 A1* | 12/2002 | Drzaic et al. | 345/107 |
| 2002/0196207 A1* | 12/2002 | Machida et al. | 345/55 |
| 2004/0136048 A1* | 7/2004 | Arango et al. | 359/296 |
| 2005/0024710 A1 | 2/2005 | Kanbe | |
| 2005/0270261 A1* | 12/2005 | Danner et al. | 345/84 |
| 2006/0038772 A1* | 2/2006 | Amundson et al. | 345/107 |
| 2007/0046622 A1* | 3/2007 | Kawai | 345/107 |
| 2007/0171510 A1 | 7/2007 | Yamazaki | |

FOREIGN PATENT DOCUMENTS

| | | |
|---|---|---|
| TW | 200410034 | 6/2004 |
| TW | 200411312 | 7/2004 |
| TW | I251710 | 3/2006 |

OTHER PUBLICATIONS

Chiu, et al., "Reflective electronic paper display utilizing electric polarized particle chains", SID 07 Digest, 2007, p. 1466-1469.
"Office Action of Taiwan Counterpart Application", issued on Sep. 30, 2011, p. 1-p. 5.

* cited by examiner

*Primary Examiner* — Quan-Zhen Wang
*Assistant Examiner* — Yuk Chow
(74) *Attorney, Agent, or Firm* — Jianq Chyun IP Office

(57) ABSTRACT

A display including a first substrate, a first electrode, a second substrate, a second electrode, and a mixed solution is provided. The first electrode is disposed on the first substrate, and the second electrode is disposed on the second substrate. In addition, the mixed solution is disposed between the first electrode and the second electrode. Moreover, the mixed solution includes a solution and a plurality of first neutral micro-particles disposed in the solution.

16 Claims, 5 Drawing Sheets

| Operation frequency | First neutral particles | Solution |
|---|---|---|
| Low frequency | High conductivity | Low conductivity |
| Low frequency | Low conductivity | High conductivity |
| High frequency | High-k | Low-k |
| High frequency | Low-k | High-k |

FIG. 1B

DISPLAY

CROSS-REFERENCE TO RELATED APPLICATION

This application claims the priority benefit of Taiwan application serial no. 96144421, filed on Nov. 23, 2007. The entirety the above-mentioned patent application is hereby incorporated by reference herein and made a part of specification.

BACKGROUND OF THE INVENTION

1. Field of the Invention

The present invention generally relates to a display, and more particularly a display utilizing particle polarization.

2. Description of Related Art

The electronic paper display technology was first developed in 1970s and featured in having the small charged balls. One side of the balls is white, and the other side is black. When an electric field is changed, the balls are rotated upwardly/downwardly to exhibit different colors. The second-generation electronic paper display technology was developed in 1990s and featured in that microcapsules filled with a liquid and charged particles were used to replace the conventional small balls. The charged particles are moved upwardly/downwardly through the control of an external electric field. When the particles are moved upwardly (in the direction approaching a reader), the color of the particles is exhibited. These conventional technologies achieve the purpose of display by using the electrophoresis produced by the charged particles. Furthermore, common electronic paper display technologies further include electronic powder, charged polymer particles, cholesteric liquid crystals, electrowetting technologies, and so on.

Along with the maturity of the technology, electronic papers have attracted the attentions of manufacturers, and many large-scale companies have joined in the research and development group. However, it still is an important subject to develop an electronic paper display technology with simple driving mode and quick response time.

SUMMARY OF THE INVENTION

Accordingly, the present invention is directed to a display, advantageous in simple driving mode and quick response time.

The present invention provides a display, which includes a first substrate, a first electrode, a second substrate, a second electrode, and a mixed solution. The first electrode is disposed on the first substrate, the second electrode is disposed on the second substrate, and the mixed solution is disposed between the first electrode and the second electrode. The mixed solution of the present invention includes a solution and a plurality of first neutral micro-particles disposed in the solution.

In an embodiment of the present invention, a conductivity of the first neutral micro-particles is in a negative relationship to a conductivity of the solution.

In an embodiment of the present invention, a dielectric constant of the first neutral micro-particles is in a negative relationship to that of the solution.

In an embodiment of the present invention, the first neutral micro-particles include metal particles.

In an embodiment of the present invention, the first neutral micro-particles include polymer particles.

In an embodiment of the present invention, a material of the first neutral micro-particles include polystyrene particles.

In an embodiment of the present invention, a material of the first neutral micro-particles include polyethylene particles.

In an embodiment of the present invention, the solution may be a non-conductive solution.

In an embodiment of the present invention, the display further includes a first dielectric layer, a first hydrophobic film layer, and a second hydrophobic film layer. The first dielectric layer is disposed on the first electrode. Furthermore, the first hydrophobic film layer is disposed on the first dielectric layer, and the second hydrophobic film layer is disposed on the second electrode.

In an embodiment of the present invention, the solution may be a conductive solution.

In an embodiment of the present invention, the first electrode may be a reflective electrode.

In an embodiment of the present invention, the second electrode may be a transparent electrode.

In an embodiment of the present invention, the display further includes a plurality of second neutral micro-particles disposed in the solution.

In an embodiment of the present invention, the display further includes a plurality of third neutral micro-particles disposed in the solution.

In an embodiment of the present invention, the first substrate and the second substrate may be a soft substrate.

In an embodiment of the present invention, the first neutral micro-particles produce a polarized self-arrangement under an electric field frequency provided by the first electrode and the second electrode.

In an embodiment of the present invention, the first neutral micro-particles have a first driving frequency.

In an embodiment of the present invention, the second neutral micro-particles have a second driving frequency.

In an embodiment of the present invention, the third neutral micro-particles have a third driving frequency.

The first neutral micro-particles of the display of the present invention are polarized to produce a self-arrangement phenomena under the electric field formed between the first electrode and the second electrode. The first neutral micro-particles are self-arranged to form a chain structure, thus changing the distribution density of the first neutral micro-particles and the transmittance of the mixed solution in the display. As such, an external light may be incident into the display and be reflected by the first electrode to the outside successfully, thereby achieving the purpose of display. The driving mode of the display of the present invention is simple.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1B is a diagram of a relationship between first neutral micro-particles and a solution according to the first embodiment of the present invention.

DESCRIPTION OF THE EMBODIMENTS

Figure 1A:
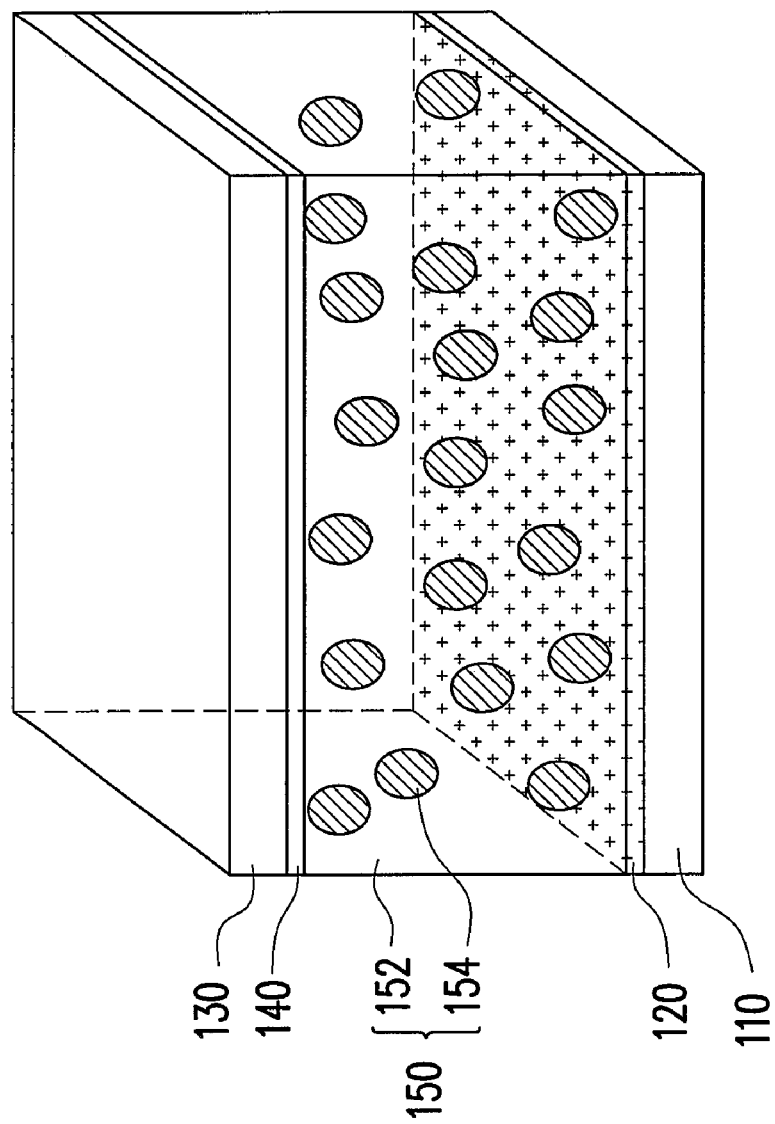
FIG. 1A is a schematic cross-sectional view of a display according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The First Embodiment

FIG. 1A is a schematic cross-sectional view of a display according to a first embodiment of the present invention. Referring to FIG. 1A, a display 100 of the present invention includes a first substrate 110, a first electrode 120, a second substrate 130, a second electrode 140, and a mixed solution 150. The first electrode 120 is disposed on the first substrate 110, and the second electrode 140 is disposed on the second substrate 130. In an embodiment, the first substrate 110 and the second substrate 130 may be a soft substrate and has a characteristic of flexibility. Furthermore, the first electrode 120 may be a reflective electrode, and the second electrode 140 may be a transparent electrode. In practice, the first electrode 120 is made of a metal material having high reflectivity, and the second electrode 140 is made of a transparent conductive material, such as indium tin oxide, indium zinc oxide, or aluminium zinc oxide.

Furthermore, the mixed solution 150 of the present invention is disposed between the first electrode 120 and the second electrode 140. Particularly, the mixed solution 150 of the present invention includes a solution 152 and a plurality of first neutral micro-particles 154 disposed in the solution 152. As shown in FIG. 1B, it should be noted that when the operation frequency of the electric field produced between the first electrode 120 and the second electrode 140 is low (for example, between a direct current and MHz), the conductivity of the first neutral micro-particles 154 is in a negative relationship to the conductivity of the solution 152. The first neutral micro-particles 154 of high conductivity are used together with a solution 152 of low conductivity, or the first neutral micro-particles 154 of low conductivity are used together with a solution 152 of high conductivity.

When the operation frequency of the electric field produced between the first electrode 120 and the second electrode 140 is high (for example, between MHz and GHz), the dielectric constant (k) of the first neutral micro-particles 154 is in a negative relationship to that of the solution 152. The high-k first neutral micro-particles 154 are used together with a low-k solution 152, or the low-k first neutral micro-particles 154 are used together with a high-k solution 152.

In this embodiment, the solution 152 is a non-conductive solution, and the first neutral micro-particles 154 have a high conductivity. Definitely, the solution 152 may also be a conductive solution, which will be illustrated in the second embodiment. In detail, the material of the first neutral micro-particles 154 includes polymer particles or metal particles. The polymer particles are, for example, polystyrene (PS) particles or polyethylene (PE) particles. The diameter of the first neutral micro-particles 154 is, for example, 3 μm.

Figure 1C:
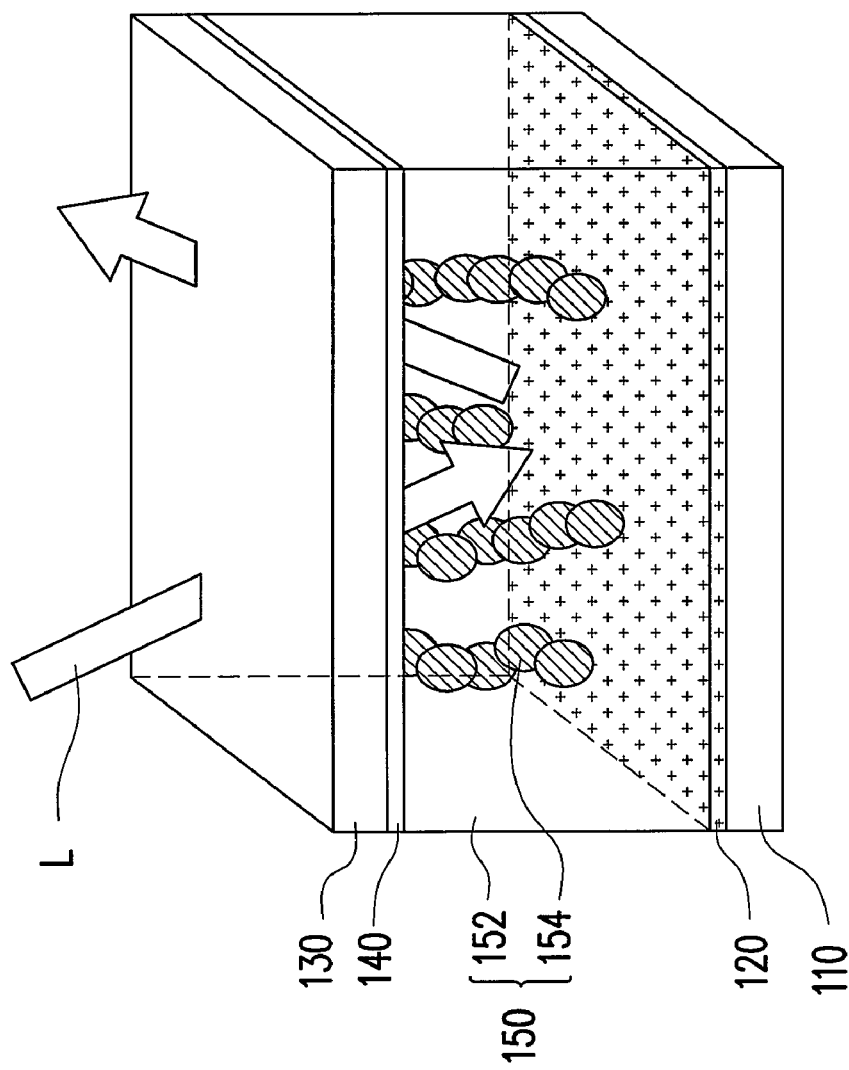
FIG. 1C is a schematic view showing an operation of the display according to the first embodiment of the present invention.

In detail, as shown in FIG. 1C, for example, a voltage signal of 48 volt, 500 kHz is applied on the first electrode 120 and the second electrode 140, such that an electric field is produced between the first electrode 120 and the second electrode 140. The first neutral micro-particles 154 will be polarized under the frequency of the additional electric field. Particularly, the polarized first neutral micro-particles 154 will attract one another to produce a self-arrangement phenomena. As shown in FIG. 1C, the first neutral micro-particles 154 are arranged to form a chain structure. In this manner, the distribution density of the first neutral micro-particles 154 is changed, thus changing the transmittance of the mixed solution 150 to allow an external light L to be incident through the second electrode 140 and then reflected by the first electrode 120 to the outside successfully to achieve the purpose of display.

On the other hand, when the first neutral micro-particles 154 are not polarized by the electric field, the first neutral micro-particles 154 assume the distribution state shown in FIG. 1A. In this manner, the external light cannot be effectively incident and be reflected by the first electrode 130 to the outside. Therefore, the electric field can be used to control the distribution state of the first neutral micro-particles 154, thereby controlling the displayed frame of the display 100 of the present invention. The display 100 of the present invention has the advantages of simple driving mode and low driving voltage. Furthermore, the response time of the display 100 is rapid.

Figure 2:
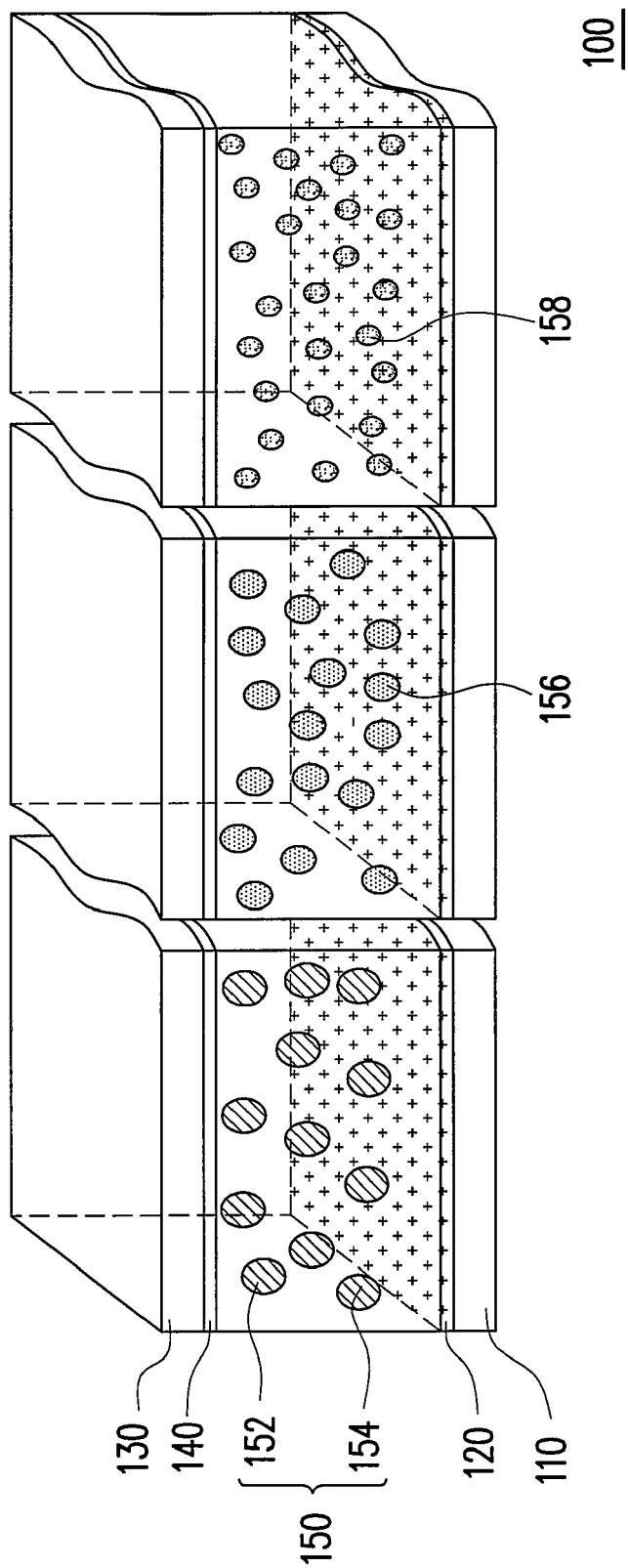
FIG. 2 is a schematic cross-sectional view of another display according to the first embodiment of the present invention.

In order to meet the requirements of full-color display, as shown in FIG. 2, the display 100 of the present invention further includes a plurality of second neutral micro-particles 156 and a plurality of third neutral micro-particles 158. The second neutral micro-particles 156 and the third neutral micro-particles 158 are also distributed in the solution 152. In an embodiment, the first neutral micro-particles 154 may be red neutral micro-particles, the second neutral micro-particles 156 may be green neutral micro-particles, and the third neutral micro-particles 158 may be blue neutral micro-particles. It should be noted that the first neutral micro-particles 154, the second neutral micro-particles 156, and the third neutral micro-particles 158 will have a first driving frequency, a second driving frequency, and a third driving frequency respectively. The first neutral micro-particles 154, the second neutral micro-particles 156, and the third neutral micro-particles 158 will be polarized under the driving voltages of different frequencies. Therefore, as long as the frequency of the applied driving voltage is controlled, the display will be controlled to display the frames of different colors.

The Second Embodiment

Figure 3:
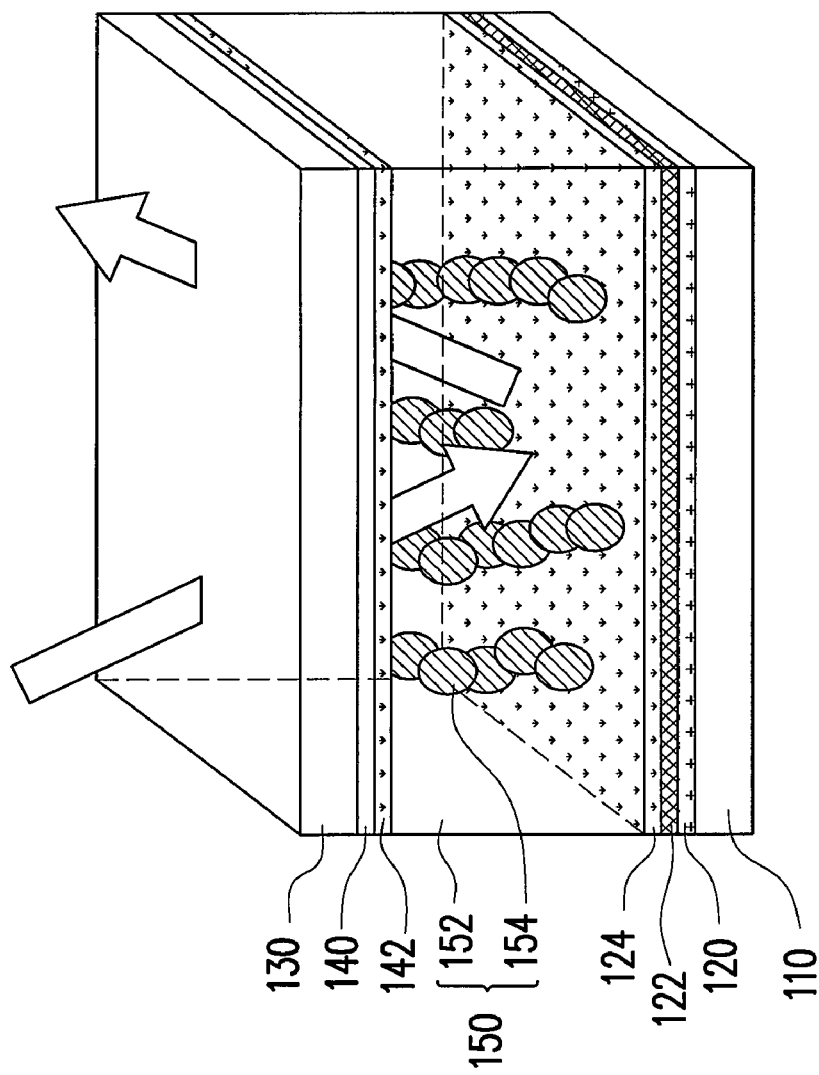
FIG. 3 is a schematic cross-sectional view of a display according to a second embodiment of the present invention.

The second embodiment is similar to the first embodiment, and the main difference between the two embodiments lies in that the solution used in the second embodiment is a conductive solution. Furthermore, a dielectric layer and a hydrophobic film layer are formed on the first electrode and the second electrode. FIG. 3 is a schematic cross-sectional view of a display according to the second embodiment of the present invention. A display 100' shown in FIG. 3 is similar to the display 100 of the first embodiment, and the similarities will not be described herein. It should be noted that the solution 152 in the display 100' of this embodiment is a conductive solution. Furthermore, the display 100' further includes a first dielectric layer 122, a first hydrophobic film layer 124, and a second hydrophobic film layer 142. The first dielectric layer 122 and the first hydrophobic film layer 124 are disposed in sequence on the first electrode 120, and the second hydrophobic film layer 142 is disposed on the second electrode 140. The display 100' of this embodiment has the same advantages of simple driving mode, quick response time, and low driving voltage like those of the display 100 of the first embodiment.

In view of the above, the first neutral micro-particles of the display of the present invention are polarized under the electric field formed between the first electrode and the second electrode, thus producing a self-arrangement phenomenon. The first neutral micro-particles are self-arranged to form a chain structure, so as to change the distribution density of the first neutral micro-particles and the transmittance of the mixed solution in the display, thereby presenting different frames. Therefore, the display of the present invention has the advantages of simple driving mode and quick response time. The display of the present invention can further achieve the purpose of full-color display by using a variety of the neutral micro-particles.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display, comprising:
    a first substrate;
    a first electrode, disposed on the first substrate;
    a second substrate;
    a second electrode, disposed on the second substrate;
    a mixed solution, disposed between the first electrode and the second electrode, comprising:
        a solution; and
        a plurality of first neutral micro-particles, disposed in the solution,
        wherein the first neutral micro-particles produce a polarized self-arrangement under an electric field frequency provided by the first electrode and the second electrode, a conductivity of the first neutral micro-particles is in a negative relationship to a conductivity of the solution when the electric field frequency is higher than 1 kHz and lower than or equal to 1 MHz, and a dielectric constant of the first neutral micro-particles is in a negative relationship to a dielectric constant of the solution when the electric field frequency is higher than 1 MHz and lower than 1 THz.

2. The display according to claim 1, wherein the first neutral micro-particles comprise metal particles.

3. The display according to claim 1, wherein the first neutral micro-particles comprise polymer particles.

4. The display according to claim 3, wherein a material of the first neutral micro-particles comprises polystyrene particles.

5. The display according to claim 3, wherein a material of the first neutral micro-particles comprises polyethylene particles.

6. The display according to claim 1, wherein the solution is a non-conductive solution.

7. The display according to claim 1, further comprising:
    a first dielectric layer, disposed on the first electrode;
    a first hydrophobic film layer, disposed on the first dielectric layer; and
    a second hydrophobic film layer, disposed on the second electrode.

8. The display according to claim 7, wherein the solution is a conductive solution.

9. The display according to claim 1, wherein the first electrode is a reflective electrode.

10. The display according to claim 1, wherein the second electrode is a transparent electrode.

11. The display according to claim 1, further comprising a plurality of second neutral micro-particles disposed in the solution.

12. The display according to claim 11, wherein the second neutral micro-particles have a second driving frequency.

13. The display according to claim 1, further comprising a plurality of third neutral micro-particles disposed in the solution.

14. The display according to claim 13, wherein the third neutral micro-particles have a third driving frequency.

15. The display according to claim 1, wherein the first substrate and the second substrate comprise a soft substrate.

16. The display according to claim 1, wherein the first neutral micro-particles have a first driving frequency.

* * * * *